US010137871B2

(12) United States Patent
Lesher et al.

(10) Patent No.: US 10,137,871 B2
(45) Date of Patent: Nov. 27, 2018

(54) ADAPTIVE BRAKING FOR A VEHICLE CONTROL SYSTEM

(71) Applicant: Bendix Commercial Vehicle Systems LLC, Elyria, OH (US)

(72) Inventors: Michael K. Lesher, North Ridgeville, OH (US); Andrew L. Kennedy, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 62 days.

(21) Appl. No.: 15/336,041

(22) Filed: Oct. 27, 2016

(65) Prior Publication Data

US 2018/0118176 A1    May 3, 2018

(51) Int. Cl.
*B60T 7/22*   (2006.01)
*B60T 7/12*   (2006.01)
(Continued)

(52) U.S. Cl.
CPC   *B60T 7/22* (2013.01); *B60T 7/12* (2013.01); *B60W 10/18* (2013.01); *B60W 30/08* (2013.01);
(Continued)

(58) Field of Classification Search
CPC .......... B60T 7/22; B60T 7/12; B60T 2201/08; B60T 2201/02; B60T 2210/32;
(Continued)

(56) References Cited

U.S. PATENT DOCUMENTS 6,427,111 B1   7/2002   Dieckmann
6,450,592 B1   9/2002   Nishizaki
(Continued)

FOREIGN PATENT DOCUMENTS

DE   102014209520 A1   11/2015
EP       1095833 A1    5/2000
JP     H10338057 A    12/1998

OTHER PUBLICATIONS

European Patent Office, "International Search Report and Written Opinion," report, dated Feb. 1, 2018, 13 pages, European Patent Office, Rijswijk Netherlands.
(Continued)

*Primary Examiner* — Muhammad Shafi
(74) *Attorney, Agent, or Firm* — Cheryl L. Greenly; Brian E. Kondas; Eugene E. Clair

(57) ABSTRACT

A controller for an adaptive braking system on a host vehicle identifies a first target in a lane of travel of the host vehicle; monitors for an active braking intervention request; monitors for other targets in adjacent lanes of travel to the host vehicle; and transmits a first braking signal at the output to control a braking action at a first braking level in response to receiving the active braking intervention request and identifying no other targets in adjacent lanes of travel to the host vehicle. If the controller identifies a second target in an adjacent lane of travel, then receives a travel signal indicative of change in the direction of travel of the host vehicle toward the second target; it will transmit a second braking signal to control the braking action at a second braking level. The second level of braking is different than the first level of braking.

11 Claims, 3 Drawing Sheets

(51) Int. Cl.
  *B60W 30/095* (2012.01)
  *B60W 10/18* (2012.01)
  *B60W 30/08* (2012.01)
  *G08G 1/16* (2006.01)
  *B60W 30/14* (2006.01)

(52) U.S. Cl.
  CPC ........ *B60W 30/095* (2013.01); *B60T 2201/02* (2013.01); *B60T 2201/08* (2013.01); *B60T 2210/32* (2013.01); *B60W 30/14* (2013.01); *G08G 1/167* (2013.01)

(58) Field of Classification Search
  CPC .... B60W 10/18; B60W 30/08; B60W 30/095; B60W 30/14; G08G 1/167
  USPC ..................................................... 701/14, 96
  See application file for complete search history.

(56) References Cited

U.S. PATENT DOCUMENTS

| | | | |
|---|---|---|---|
| 7,331,642 B2 | 2/2008 | Miller | |
| 8,219,299 B2 | 7/2012 | Thiel | |
| 8,224,551 B2 | 7/2012 | Grolle | |
| 8,510,012 B2 | 7/2013 | Amato | |
| 8,527,172 B2 | 9/2013 | Moshchuk | |
| 8,543,309 B2 | 9/2013 | Taneyhill | |
| 8,977,435 B2 | 3/2015 | Kobana | |
| 8,972,147 B2 | 5/2015 | Taneyhill | |
| 9,031,743 B2 | 5/2015 | Okita | |
| 9,272,710 B2 | 3/2016 | Jeon | |
| 2001/0014846 A1* | 8/2001 | Sawamoto | B60K 31/0008 701/96 |
| 2004/0022416 A1 | 2/2004 | Lemelson | |
| 2004/0193374 A1 | 9/2004 | Hac | |
| 2005/0264099 A1* | 12/2005 | Kamiya | B60T 7/22 303/15 |
| 2006/0089801 A1* | 4/2006 | Sawamoto | B60W 30/16 701/301 |
| 2012/0083983 A1 | 4/2012 | Danz | |
| 2012/0296522 A1 | 11/2012 | Otuka | |
| 2015/0012196 A1 | 1/2015 | Matoy | |
| 2016/0016561 A1* | 1/2016 | Lee | B60T 7/22 701/70 |

OTHER PUBLICATIONS

BENDIX Commercial Vehicle Systems LLC, "Bendix Wingman Fusion", advertisement, Sep. 2015, Bendix Commercial Vehicle Systems LLC, Elyria Ohio, USA.

\* cited by examiner

ADAPTIVE BRAKING FOR A VEHICLE CONTROL SYSTEM

BACKGROUND

The present invention relates to embodiments of a vehicle control system with adaptive braking. A vehicle control system, such as an adaptive cruise control system with braking, will apply the vehicle service brakes automatically in response to certain driving situations. For example, if a target vehicle is detected having a negative relative velocity and the host vehicle is within a predetermined brake activation zone from the target vehicle; the vehicle control system will automatically apply the service brakes. If a steering action is detected by the vehicle control system, the service brake actuation is removed with the intent to allow the driver override capability to maintain control of the vehicle. In some driving situations, however, the automatic braking action should not be removed.

SUMMARY

Various embodiments of a controller for a vehicle system include an input for receiving a travel signal indicative of a direction of travel of the host vehicle and an output for transmitting a braking signal to control a braking action of the host vehicle and a processor having control logic. The control logic is capable of identifying a first target in a lane of travel of the host vehicle; monitoring for an active braking intervention request; monitoring for other targets in adjacent lanes of travel to the host vehicle; and transmitting a first braking signal at the output to control a braking action at a first braking level in response to receiving the active braking intervention request and identifying no other targets in adjacent lanes of travel to the host vehicle. The control logic is also capable of identifying a second target in an adjacent lane of travel; receiving a travel signal at the input indicative of change in the direction of travel of the host vehicle toward the identified second target; and transmitting a second braking signal at the output to control the braking action at a second braking level in response to receiving the active braking intervention request, identifying the second target and receiving the travel signal indicative of the host vehicle moving to toward the second target, the second level being different than the first level.

In accordance with another aspect, various embodiments of a method of controlling a vehicle system include identifying a first target in the lane of travel of a host vehicle; receiving an active braking intervention request and transmitting a first braking signal to control a braking action at a first braking level in response to the active braking request. The method is capable of identifying a second target in an adjacent lane of travel to the host vehicle; receiving a signal indicative of a the host vehicle changing to the adjacent lane of travel toward the second target; and transmitting a second braking signal to control the braking action at a second braking level in response to the host vehicle moving toward the second target, the second level being different than the first level.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
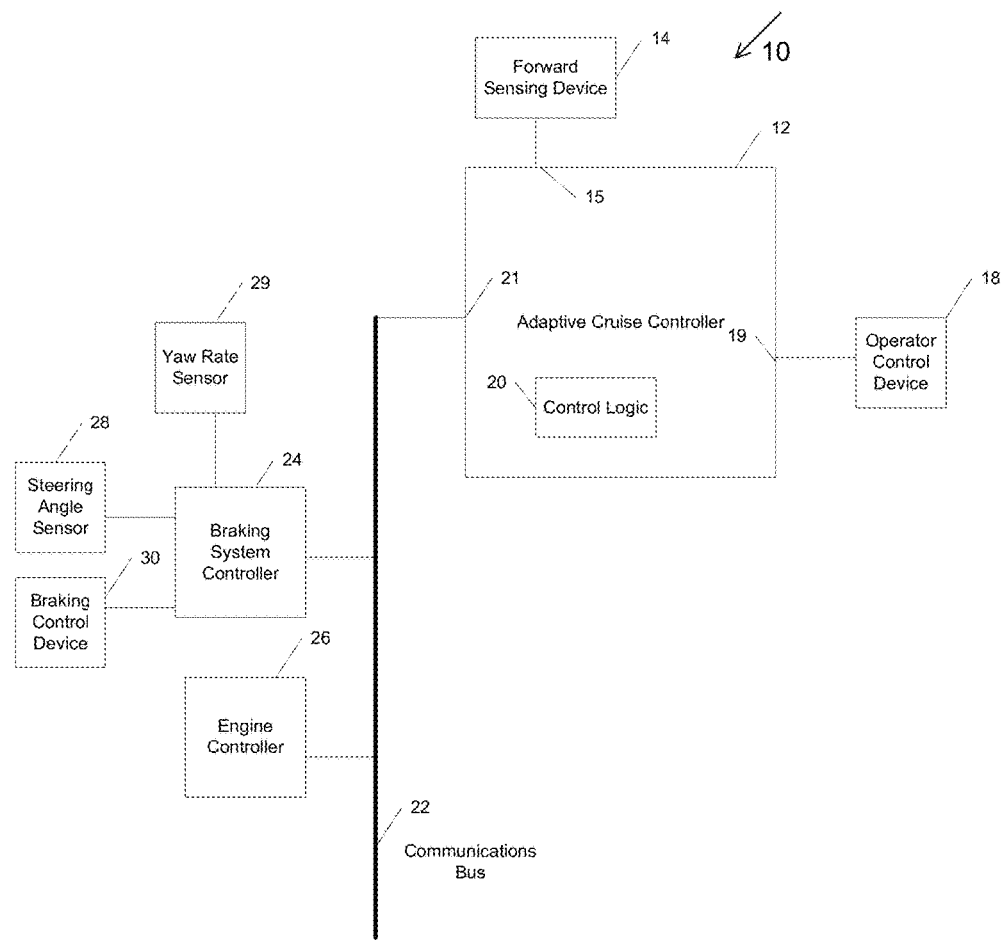
FIG. 1 illustrates a vehicle system according to one example of the invention.

FIG. 1 illustrates a vehicle system 10 according to one example of the invention. The vehicle system 10 includes an adaptive cruise controller 12, a braking system controller 24 and an engine controller 26. The adaptive cruise controller 12, the braking system controller 24 and the engine controller 26 communicate over a vehicle serial communications bus 22.

The braking system controller 24 receives and transmits messages over the vehicle serial communications bus 22. The braking system controller 24 receives a signal from a steering angle sensor 28 and a yaw rate sensor 29. The braking system controller 24 transmits a braking control signal to at least one braking control device 30. The braking system controller 24 may transmit the steering angle sensor signal and yaw rate sensor signal over the vehicle serial communications bus 22 to the adaptive cruise controller 12. The steering angle sensor signal indicates both the direction of the steering action and the rate of change of the steering action. The yaw rate signal indicates the yaw direction and angular rate of change of the movement of the vehicle.

The engine controller 26 receives and transmits messages over the vehicle serial communications bus 22. The engine controller 26 may control the speed of the engine to slow down or increase the speed of the vehicle in response to messages on the vehicle serial communications bus 22 from the adaptive cruise controller 12 and the braking system controller 24.

The adaptive cruise controller 12 receives a signal from an operator controlled device 18 at an input 19. The operator controlled device 18 may be a switch in the cab of the vehicle that can enable or disable an adaptive cruise control function. The adaptive braking function is normally always enabled, regardless of the state of the operator controlled device 18. The adaptive cruise controller 12 receives at least one signal from at least one forward sensing device 14 at an input 15. The forward sensing device 14 may be a camera, a radar or a LIDAR. Alternatively, the forward sensing device 14 may be a combination of any of those devices. Alternatively, sensing of a forward vehicle or obstacle can be accomplished by Vehicle to Vehicle (V2V) communication or via global positioning systems (GPS). The operator controlled device 18 and at least one forward sensing device 14 are shown connected directly to the adaptive cruise controller 12, however they may be remote devices and communicate with the adaptive cruise controller 12 over the vehicle serial communications bus 22 or wirelessly.

The adaptive cruise controller 12 includes a processor with control logic 20 for controlling the adaptive cruise control and adaptive braking systems. The adaptive cruise controller 12 may also include functionality to control lane departure warning and other systems. The control logic 20 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 20.

The control logic 20 is capable of receiving the steering angle sensor signal and yaw rate signal over the vehicle serial communications bus 22 at port 21. The control logic 20 may use other means of determining the direction of travel of the vehicle or the change of direction of travel of the vehicle, such as global positioning systems and accelerometers. A signal that can be used to determine the direction of travel of a vehicle may be known as a travel signal.

The control logic 20 is capable of identifying targets directly in front of and adjacent to a lane of travel of a host vehicle by using the at least one forward sensing device 14. The targets may be other vehicles traveling in the same lane of travel or vehicles traveling in adjacent lanes of travel and traveling in the same direction as the host vehicle. The targets may be non-moving obstacles in the lane of travel or to the side of the lane of travel of the host vehicle.

The control logic 20 is capable of transmitting signals to the vehicle communications bus 22 via port 21 to be received by the braking system controller 24 and the engine controller 26 to modify the speed of the host vehicle to maintain a following distance between the host vehicle and any moving target when functioning in the adaptive cruise control mode. The control logic 20 is capable of transmitting a request for a braking response over the vehicle serial communications bus 22 at port 21. Alternatively, the functions of the adaptive cruise controller 12 and the braking system controller 24 can be combined in a single controller.

Therefore, a controller for a vehicle system includes an input for receiving a travel signal indicative of a direction of travel of the host vehicle and an output for transmitting a braking signal to control a braking action of the host vehicle and a processor having control logic. The control logic is capable of identifying a first target in a lane of travel of the host vehicle; monitoring for an active braking intervention request; monitoring for other targets in adjacent lanes of travel to the host vehicle; and transmitting a first braking signal at the output to control a braking action at a first braking level in response to receiving the active braking intervention request and identifying no other targets in adjacent lanes of travel to the host vehicle. The control logic is also capable of identifying a second target in an adjacent lane of travel; receiving a travel signal at the input indicative of change in the direction of travel of the host vehicle toward the identified second target; and transmitting a second braking signal at the output to control the braking action at a second braking level in response to receiving the active braking intervention request, identifying the second target and receiving the travel signal indicative of the host vehicle moving to toward the second target, the second level being different than the first level.

Figure 2:
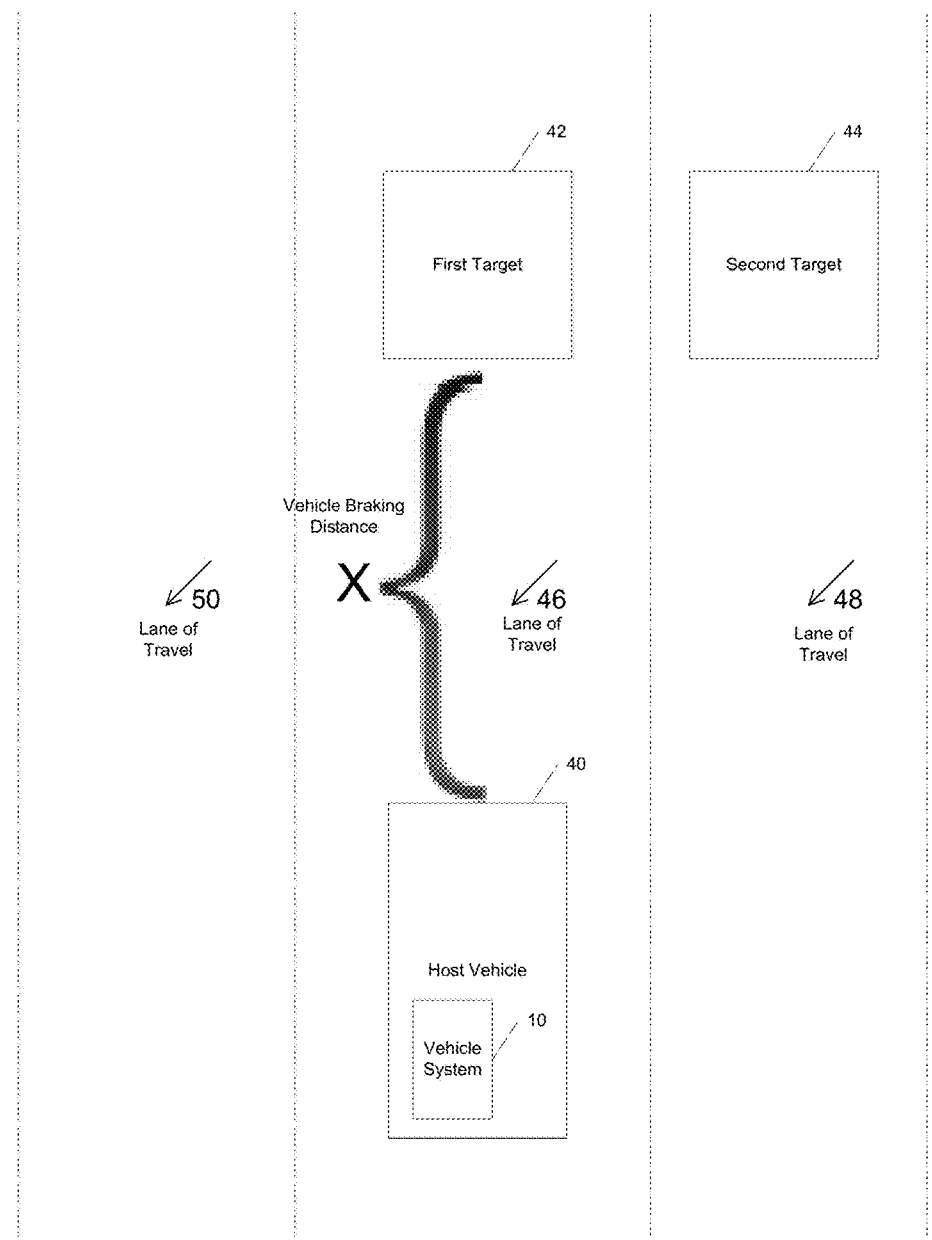
FIG. 2 illustrates a vehicle having the system of FIG. 1 on a roadway.

FIG. 2 illustrates a host vehicle 40 having the vehicle system 10. The host vehicle 40 is traveling in a lane of travel 46. The host vehicle 40 adaptive cruise controller 12 has identified two targets 42, 44 using the at least one forward sensing device 14. A first target 42 is traveling in the same lane of travel 46 as the host vehicle 40. An additional target, such as second target 44, is traveling in an adjacent lane of travel 48. If the adaptive cruise control function is enabled, the adaptive cruise controller 12 maintains a following distance behind the first target 42 by monitoring the change in velocity of the first target 42 with respect to the host vehicle 40. The adaptive cruise controller 12 may send a signal to the engine controller 26 to reduce the engine speed to slow the host vehicle 40 and to maintain the following distance.

Even if adaptive cruise control is not enabled, the adaptive braking function of the adaptive cruise controller 12 still sets a vehicle braking distance X based on the target vehicle 42. Once the distance between the host vehicle 40 and the target vehicle 42 is less than the vehicle braking distance X, the adaptive cruise controller 12 will transmit a signal to the braking system controller 12 to initiate a braking action. The adaptive cruise controller 12 may send a signal to the braking system controller 24 to begin braking at a first level. Once any braking is initiated, the adaptive cruise control function of maintaining a following distance is disabled.

The driver of the host vehicle 40 may recognize that the following distance is decreasing rapidly and steer the host vehicle 40 to avoid the first target 42 that is in the same lane of travel 46. In one example, the driver steers the host vehicle 40 to the right toward the adjacent lane of travel 48. The adaptive cruise controller 12 receives the signal from the steering angle sensor 28 or yaw rate sensor 29 indicating the change of direction of the host vehicle 40. The signals can be received either directly or via the vehicle serial communications bus 22. The adaptive cruise controller 12 does not attempt to modify the steering direction of the vehicle. Since the adaptive cruise controller 12 has already recognized second target 44 in the adjacent lane of travel 48, the adaptive cruise controller 12 will transmit a braking request for a second level of braking that is different than the first level of braking.

In one example, the second braking level request is greater than the first braking level. With this change to a second braking level, the host vehicle 40 is still controllable as the brakes do not suddenly release entirely when the host vehicle 40 changes lanes as in the prior art. Controllability is necessary as an obstacle, such as second target 44, may still be present in the new direction of travel of the host vehicle 40.

In another example, the driver of the host vehicle 40 steers the host vehicle 40 to the left into the lane of travel 50. Since the adaptive cruise controller 12 detected no targets in the lane of travel 50, the first level of braking will be released as soon as the adaptive cruise controller 12 receives the steering angle or yaw rate information indicating the driver has changed the host vehicle 40 to the lane of travel 50.

Figure 3:
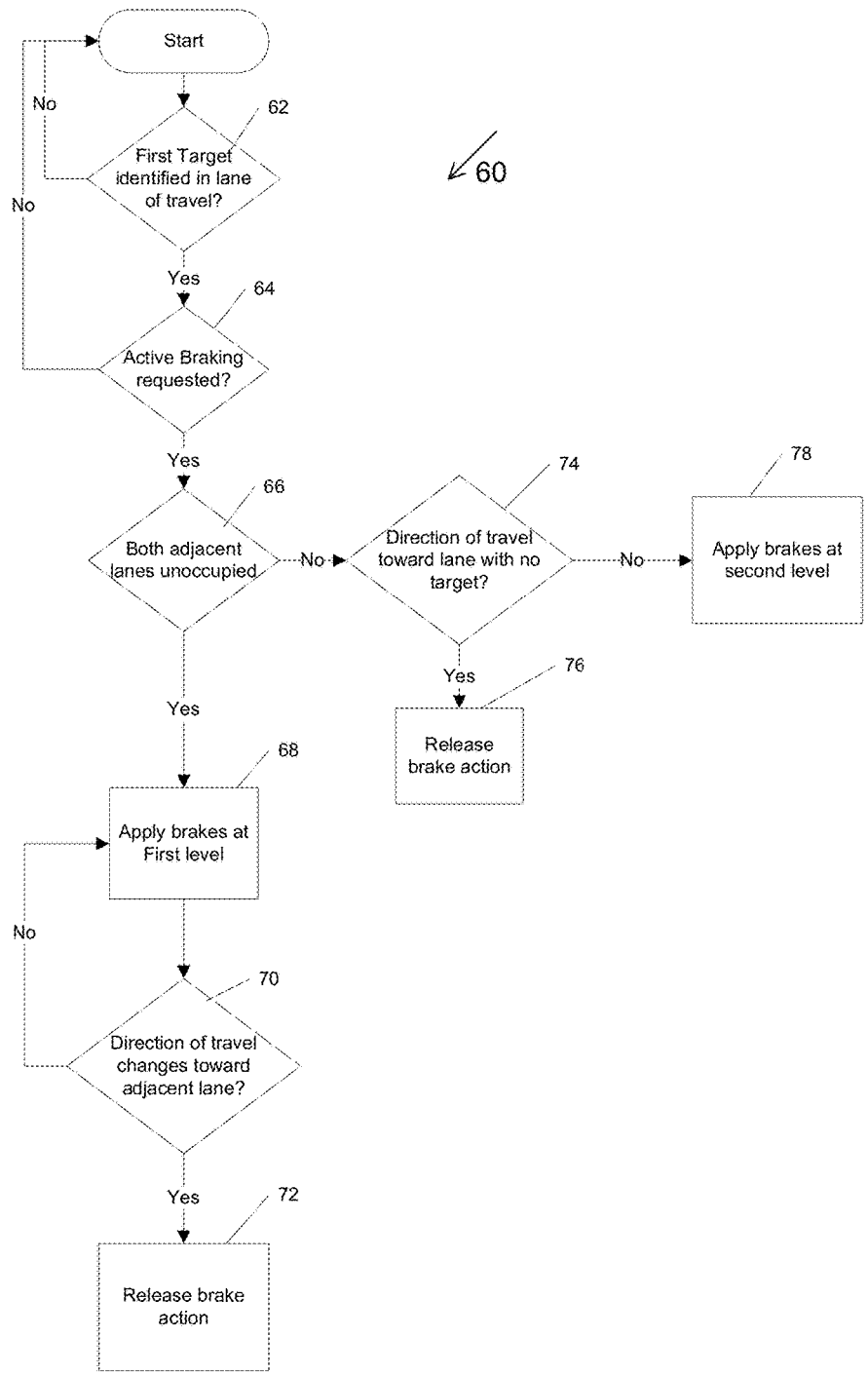
FIG. 3 illustrates a flowchart according to an example of the present invention.

FIG. 3 illustrates a method 60 of implementing the adaptive braking in the vehicle control system according to one example. The method 60 starts with step 61.

In step 62, the control logic 20 determines if a first target is identified in the same lane of travel as the host vehicle. If no target is identified in the same lane of travel, the method 60 returns to start step 61. If a first target is identified in the same lane of travel, the method 60 continues to step 64.

In step 64, the control logic 20 determines if adaptive braking is requested. As stated previously, the adaptive braking function is always ready to intercede if certain conditions are met. The control logic 20 determines if the actual distance between the host vehicle 40 and the first target is less than a braking distance X. Braking distance X is set as a predetermined distance in meters or as a time value that would require a braking intervention to mitigate any possible collision. If the distance is greater than braking distance X, then the method 60 returns to step 61. If the distance is less than the braking distance X, then the adaptive braking function is enabled and the control logic 20 will prepare to send an adaptive braking request. Even if the driver begins a manual service brake application of the host vehicle 40, his brake application may not be great enough to mitigate any potential collision.

In step 66, the control logic 20 determines if the lanes adjacent to the lane of travel of the host vehicle 40, including the berms, are unoccupied by any target vehicle or obstacle. If the lanes or berms to either side of the lane of travel of the host vehicle 40 are free of any obstacles or berms, the method 60 continues to step 68.

In step 68, the control logic 20 transmits a signal requesting that the brakes be applied at a first level. In one example, the first level is a percentage of the maximum amount of braking power available to the vehicle. If the host vehicle 40 is an air braked vehicle, the maximum amount of braking power is the air pressure available to the braking system. In one example, the maximum amount of braking power is about one hundred (100) psi. The first level of a braking request is set at between about forty percent and sixty percent of the maximum braking level. Alternatively, the first level of a braking request may be set as a percentage of a second level braking request, as will be described.

In step 70, the control logic 20 monitors for a change in direction of travel of the vehicle indicating the driver of the host vehicle 40 is moving the vehicle toward a lane without any target vehicle or obstacle. The direction of travel can be received from a steering angle signal or yaw rate signal on the vehicle communications bus 22. If the change in the signal is indicative of the driver taking action to move the host vehicle 40 toward a lane without any target vehicle or obstacle, the control logic 20 transmits a request for the braking action to be released in step 72. If the steering angle signal indicates the host vehicle 40 is not moving out of the lane of travel having the first target vehicle 42, then the control logic 20 returns to step 68 and continues to transmit a request for the first level braking action to be applied.

If any target vehicle or obstacle is detected in an adjacent lane or berm by the at least one forward sensing device 14 in step 66, then the method 60 proceeds to step 74. The control logic 20 then monitors for a change in direction of travel of the vehicle in step 74. If the change of direction indicates the driver of the host vehicle 40 is moving the vehicle toward a lane without any target vehicle or obstacle, the control logic 20 transmits a request for the braking action to be released in step 76. The direction of travel can be received from a steering angle signal or yaw rate signal on the vehicle communications bus 22.

If the signal indicates the host vehicle 40 is moving toward a lane with a second target vehicle or obstacle, the method 60 continues to step 78. In step 78, the control logic 20 transmits a second level brake apply value. In one example, the second level is greater than the first level. In another example, the second level is the maximum amount of braking power is the air pressure available to the braking system.

In another example, the brake apply, whether at the first level or the second level, remains active until the threat of a collision with any target vehicle or obstacle is mitigated. In one example, the host vehicle 40 may be braked automatically until the host vehicle 40 comes to a complete stop. In another example, the braking action is maintained until the deceleration of the host vehicle 40 is great enough that the collision is mitigated. In any instance, the driver of the host vehicle 40 can release the brake apply function by actuating the accelerator pedal. The expectation is that the driver will then either park the vehicle or hold the service brakes applied himself.

Therefore, a method of controlling a vehicle control system comprises identifying a first target in the lane of travel of a host vehicle; receiving an active braking intervention request and transmitting a first braking signal to control a braking action at a first braking level in response to the active braking request. The method also includes identifying a second target in an adjacent lane of travel to the host vehicle; receiving a signal indicative of a the host vehicle changing to the adjacent lane of travel toward the second target; and transmitting a second braking signal to control the braking action at a second braking level in response to the host vehicle moving toward the second target, the second level being different than the first level.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for a vehicle system on a host vehicle comprising:
    an input for receiving a travel signal indicative of a direction of travel of the host vehicle;
    an output for transmitting a braking signal to control a braking action of the host vehicle;
    a processor having control logic, the control logic capable of:
        identifying a first target in a lane of travel of the host vehicle;
        monitoring for an active braking intervention request;
        monitoring for an additional target in an adjacent lane of travel to the host vehicle;
        transmitting a first braking signal at the output to control a braking action at a first braking level in response to receiving the active braking intervention request and identifying no other targets in adjacent lanes of travel to the host vehicle;
        identifying the additional target in the adjacent lane of travel;
        receiving the travel signal at the input indicative of a change in the direction of travel of the host vehicle toward the identified additional target; and
        transmitting a second braking signal at the output to control the braking action at a second braking level in response to receiving the active braking intervention request, identifying the additional target and receiving the travel signal indicative of the host vehicle moving to toward the additional target, the second level being different than the first level.

2. The controller as in claim 1, wherein the second braking level is greater than the first braking level.

3. The controller as in claim 1, wherein the first target is a vehicle and the additional target is a vehicle.

4. The controller as in claim 1, wherein the first target is a vehicle and the additional target is a stationary object.

5. The controller as in claim 1, wherein the control logic is further capable of:
    receiving the travel signal indicative of the host vehicle moving to a lane of travel with no targets and discontinuing transmitting the second braking signal, thereby releasing the braking action.

6. The controller as in claim 1, wherein the control logic identifies the first target vehicle using at least one of an associated radar, a camera and a LIDAR.

7. The controller as in claim 1, wherein the signal indicative of a direction of travel of the host vehicle is received from at least one of a steering angle sensor and a yaw rate sensor.

8. The controller as in claim 1, wherein the output for transmitting a signal to control a braking response communicates with a braking system controller.

9. The controller as in claim 1, wherein the second braking level is a maximum available braking level.

10. The controller as in claim 9, wherein the first braking level is between about forty percent and sixty percent of the second braking level.

11. The controller as in claim 1, further comprising an input for receiving a request for adaptive cruise control; wherein the control logic maintains a predetermined following distance behind the first target in response to a request for adaptive cruise control until receiving the active braking intervention request.

\* \* \* \* \*